United States Patent [19]

Tunoda

[11] Patent Number: 4,484,720
[45] Date of Patent: Nov. 27, 1984

[54] DRAG MECHANISMS OF FISHING SPINNING REELS

[75] Inventor: Kikuo Tunoda, Hiroshima, Japan

[73] Assignee: Ryobi Limited, Fuchu, Japan

[21] Appl. No.: 363,005

[22] Filed: Mar. 29, 1982

[30] Foreign Application Priority Data

Apr. 6, 1981 [JP] Japan .............................. 56-49870[U]

[51] Int. Cl.³ ............................................ A01K 89/00
[52] U.S. Cl. .................................. 242/218; 242/219; 242/220
[58] Field of Search ................ 242/84.21 R, 211, 212, 242/213, 214, 216, 217, 218, 219, 220, 221, 84.1 R; 192/93 A, 95

[56] References Cited

U.S. PATENT DOCUMENTS

| 929,867 | 8/1909 | Meisselbach et al. | 242/220 |
| 1,663,800 | 3/1928 | Kautzky, Jr. | 242/220 |
| 1,829,006 | 10/1931 | Kautzky, Jr. | 242/220 X |
| 2,620,052 | 12/1952 | Andersson | 242/220 X |
| 3,297,275 | 1/1967 | Sarah | 242/219 X |
| 3,874,615 | 4/1975 | Fukushima | 242/219 |
| 4,191,343 | 3/1980 | Morishita | 242/84.21 R |
| 4,278,217 | 7/1981 | Blackwell | 242/217 |

Primary Examiner—Stuart S. Levy
Assistant Examiner—David Werner

[57] ABSTRACT

In a drag mechanism of a fishing spinning reel of the type wherein a rotor is permitted to slip rotate, there is provided a ratchet wheel, a pawl operating cam rotatable a predetermined angle relative to the ratchet wheel, and a plurality of pawls operated by the pawl operating cam. The pawls are caused to engage or disengage the ratchet wheel by forward or reverse rotation of a handle.

4 Claims, 10 Drawing Figures

DRAG MECHANISMS OF FISHING SPINNING REELS

BACKGROUND OF THE INVENTION

This invention relates to a drag mechanism of a fishing spinning reel that permits slip rotation of the rotor of the reel.

Two types of the drag mechanism have been known, one permitting slip rotation of the spool, while the other permitting slip rotation of the rotor.

Although the latter type is more advantageous than the former type in that the fishing string is not twisted, but at the time of taking up the string due to the resistance of the guide of the fishing rod and lost motions of various operating members, unless adjusting the drag pressure each time the spinning reel is used, only the handle rotates in vain and the bail arm does not rotate in the opposite direction so that it is often impossible to take up the string thus failing to catch a fish.

SUMMARY OF THE INVENTION

It is therefore an object of this invention to provide an improved drag mechanism of a fishing spinning reel that can positively take up the string and can ensure accurate and rapid operation of the drag mechanism.

According to this invention, there is provided a drag mechanism of a fishing spinning reel of the type comprising a hollow handle shaft, a drag shaft concentrically extending through the hollow handle shaft, a ratchet wheel and a master gear for rotating a rotor, the ratchet wheel and the master gear being mounted on an inner end of the handle shaft, a supporting plate supporting the inner end of the handle shaft, drag washers clamping the master gear therebetween, a drag knob threaded onto an outer end of the drag shaft and a spring interposed between the knob and an outer end of the drag shaft thereby permitting the rotor to slip rotate, characterized by comprising a pawl operating cam provided with radial cam operating members and secured to the inner end of the handle shaft such that the pawl operation cam can rotate a predetermined angle relative to the ratchet wheel and a plurality of pawls pivotally mounted on a supporting plate secured to the ratchet wheel such that the pawls are operated by the cam operating members, the master gear being provided with teeth which engage or disengage from the pawls when the handle is rotated in a forward or reverse direction.

BRIEF DESCRIPTION OF THE DRAWINGS

In the accompanying drawings:

FIGS. 2A and 2B are sectional views taken along a line II—II shown in FIG. 1 in which FIG. 2A shows a state in which the handle is rotated in the forward direction and FIG. 2B shows a state in which the handle is rotated in the reverse direction;

DESCRIPTION OF THE PREFERRED EMBODIMENT

Figure 1:
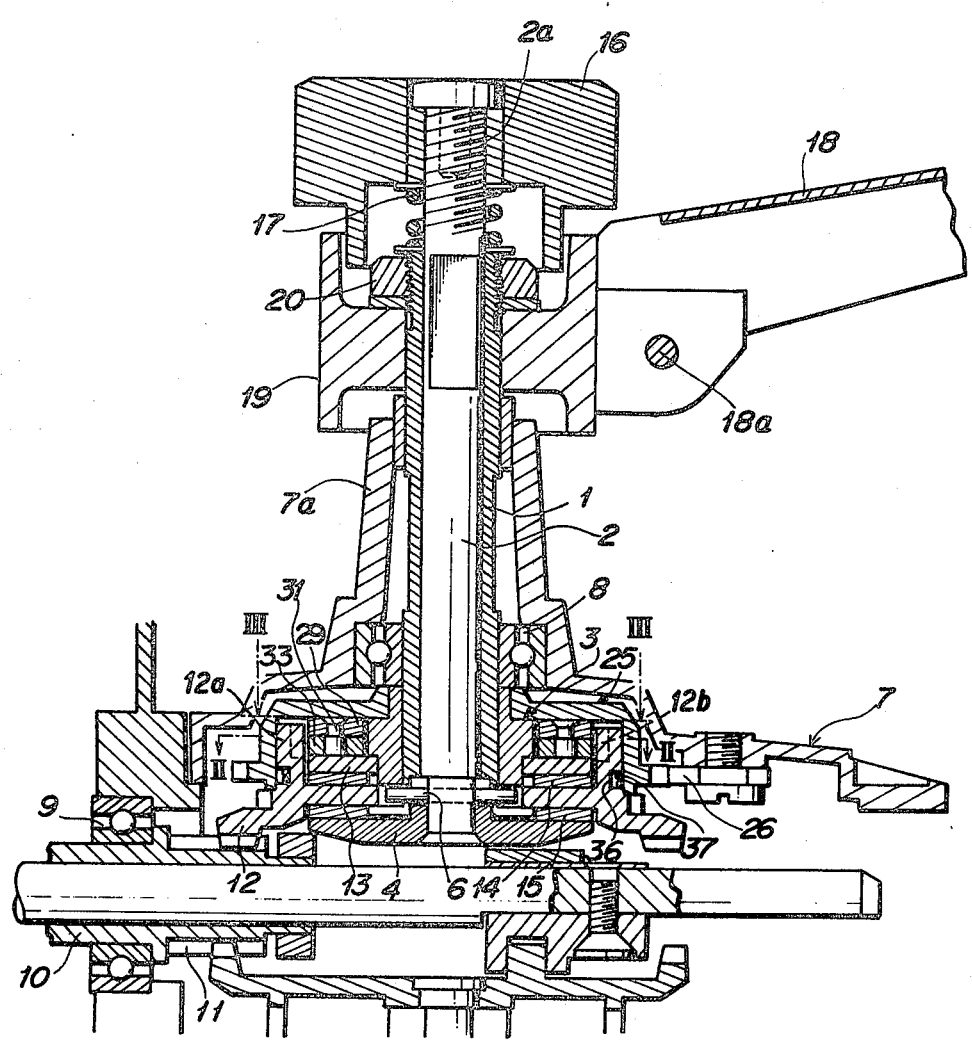
FIG. 1 is a longitudinal sectional view showing the drag mechanism of a spinning reel embodying the invention.
Figure 5:
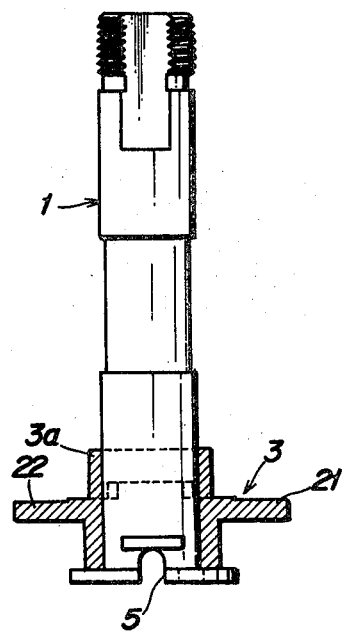
FIG. 5 is a side view of the handle shaft.
Figure 6:
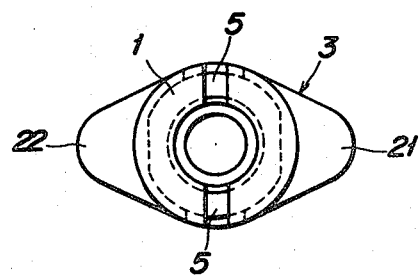
FIG. 6 is a bottom view of the handle shaft.

As shown in FIG. 1, the drag mechanism of this invention comprises a hollow handle shaft 1 and a drag shaft 2 fitted in the handle shaft 1 to be slidable in the longitudinal direction a pawl operating cam 3 at the inner end of the handle shaft 1 and a supporting plate 4 of a drag washer on the inner end of the drag shaft 2 are engaged by notches 5 and a pin 6 not to rotate as shown in FIG. 5 and 6. The handle shaft 1 is rotatably supported by the boss 7a of the main body 7 of the reel 7 by a ball bearing 8 but not to move in the axial direction. The main body 7 is in the form of a housing, only a part of which is shown in the drawing.

The torque of the handle shaft 1 transmitted to a rotor, not shown, in the following manner. The rotor is supported by the main body 7 through a ball bearing 9 and a sleeve 10. A pinion 11 secured to the sleeve 10 meshes with a master gear 12 supported by the handle shaft 1.

The master gear 12 is rotatably mounted on the handle shaft 1, that is the cylindrical portion 3a of the pawl operating cam 3. Superposed washers 13 and 14 are interposed between the pawl operating cam 3 and the master gear 12 and a washer 15 is interposed between the master gear 12 and the supporting plate 4. A drag knob 16 is threaded on threads 2a at the outer end of the drag shaft 2. A drag spring 17 is interposed between the knob 16 and the outer end of the handle shaft 1 to be compressed by the rotation of the knob 16. Thus, the master gear 12 is fixed to or released from the handle shaft 1 by the force of the drag spring 17 and the resiliency of the washers 14 and 15. Furthermore, the master gear 12 can slip or rotate with reference to the handle shaft 1 with a suitable frictional force.

A handle boss 19 is nonrotatably secured to the outer end of the handle shaft 1 by a nut 20 and a handle 18 is foldably mounted on the boss 19 by a pin 18a.

Figure 4:
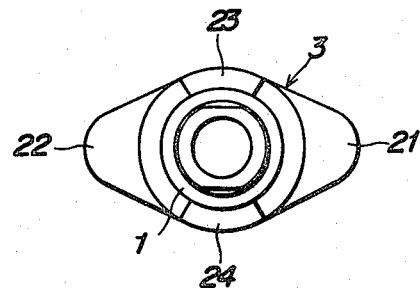
FIG. 4 is a plan view showing the handle shaft.

As shown in FIGS. 4–6, the pawl operating cam 3 is provided with a pair of pawl operating cam members 21 and 22 symmetrically projecting in radial directions and a cylindrical portion 3a at its base, the cylindrical portion 3a being provided with a pair of symmetrical stop members 23 and 24.

Figure 7:
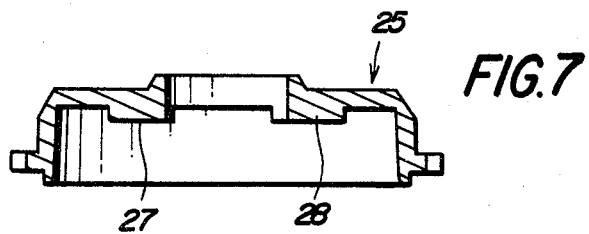
FIG. 7 is a sectional view showing a ratchet wheel of the drag mechanism.
Figure 8:
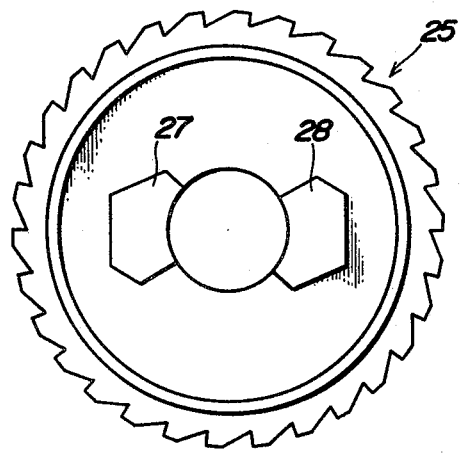
FIG. 8 is a bottom view of the ratchet wheel.

A cup shaped ratchet wheel 25 fitted about the cylindrical portion 3a of the pawl operating member 3 is engaged by a pawl 26 pivotally mounted on the main body 7 for preventing reverse rotation. Further, as shown in FIG. 7, the ratchet wheel 25 is provided with polygonal bosses 27 and 28 which engage against the stop members 23 and 24 for permitting the handle shaft 1 to rotate in the reverse direction for a predetermined angle.

Figure 2A:
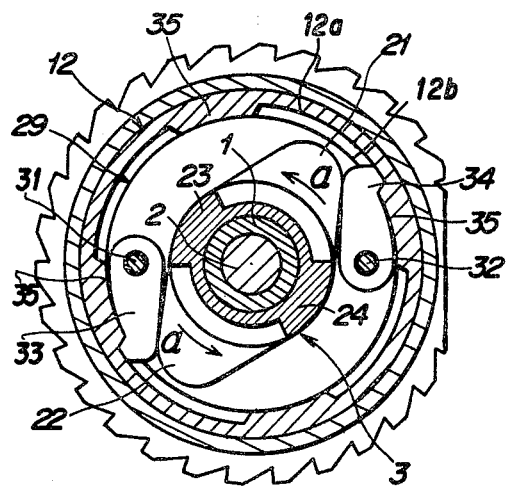
Figure 2B:
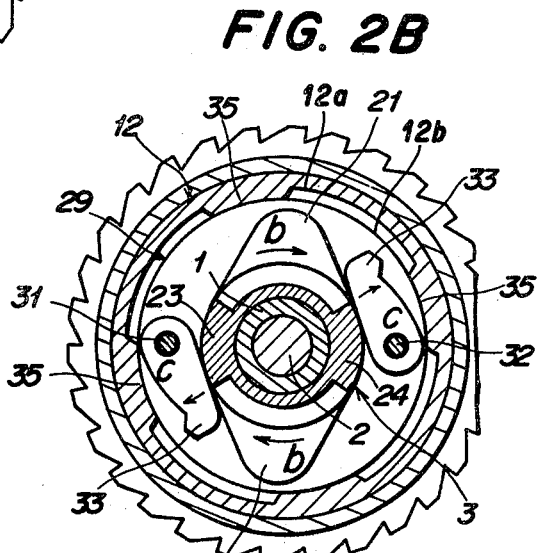
Figure 9:
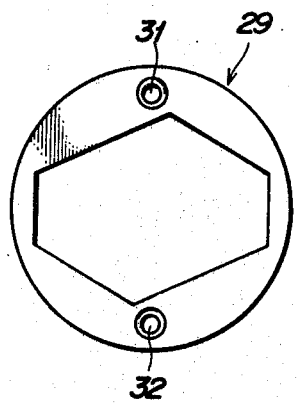
FIG. 9 is a plan view showing a pawl supporting plate of the drag mechanism.

The polygonal bosses 27 and 28 are also used to nonrotatably fit the pawl supporting plate 29 in the ratchet wheel 25. As shown in FIG. 9, the pawl supporting plate 29 is provided with a pair of pins 31 and 32 at symmetrical positions for pivotally supporting pawls 33 and 34 as shown in FIGS. 1, 2A and 2B.

Figure 3:
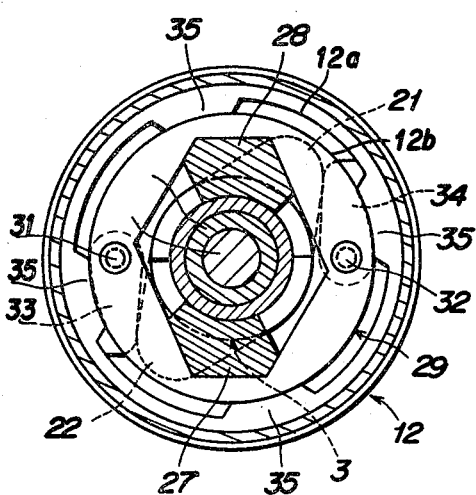
FIG. 3 is a sectional view taken along a line III—III shown in FIG. 1.

As shown in FIG. 1, the pawls 33 and 34 are positioned between the pawl operating cam 3 and the master gear 12 to be urged by the cam members 21 and 22 to rotate outwardly. A plurality of (in this example 4) equally spaced apart teeth or projections 35 are formed on the inner periphery of the sleeve portion or hub 12a master gear 12 so as selectively to engage the tips of the pawls 33 and 34 in the seats 12b between projections 35 and to disengage them from such seats, as shown in FIGS. 2A, 2B and 3.

A brake spring 37 is contained in a groove 36 on the outer periphery of the master gear 12 for applying a suitable resistance to the ratchet wheel 25 and the master gear 12 so as to prevent the ratchet wheel 25 and the pawl operating cam 3 from rotating beyond the predetermined angle.

Like the prior art drag mechanism, a suitable drag pressure can be obtained by clamping the drag knob 16.

When the string is rapidly pulled by a fish while the string is being taken up, reverse rotation of the handle 18 causes the operation cam 3 in a state shown in FIG. 2A to rotate in the direction of arrow a to release the pressure upon the pawls 33 and 34 applied by cam members 21 and 22, so that the pawls 33 and 34 are disengaged from the teeth 35 of the master gear 12 by the torque of the master gear 12 generated at the same time, whereby the pawls 33 and 34 rotate toward the axis as shown in FIG. 23.

Accordingly, the master gear 12 now released from the pawls 23 and 24 can rotate in the reverse direction b so that the rotor coupled with the master gear 12 through pinion 11 and the bushing 10 can rotate in the reverse direction. As a consequence, the fishing string is payed out to prevent excessive tension of the string.

As the handle is rotated in the forward direction from the state described above, the pawl operating cam 3 is rotated in the direction b from the state shown in FIG. 2B through the handle shaft 1 so that the pawls 33 and 34 are urged outwardly by the cam members 21 and 22 of the cam 3. Thus, the pawls 33 and 34 rotate outwardly about pins 31 and 32 as shown by arrow c to engage teeth 35 of the master gear 12 thus resuming the state shown in FIG. 2A.

However, the forward torque of the handle 18 is transmitted to the master gear 12 through handle shaft 1, pawl operating cam 3 and pawls 33 and 34 to act as a forward torque so that the rotor is rotated in the forward direction through pinion 11 and sleeve 10, thus taking up the fishing string.

It should be understood that the number of pairs of the cam members 21 and 22 of the pawl operating cam 3 and the pawls 33 and 34 is not limited to two as shown.

As above described, according to the drag mechanism of the fishing spinning reel embodying the invention, as it is not only possible to adjust the drag pressure to any desired value by the operation of the drag knob but also possible to take up the fishing string by causing the pawls 33 and 34 to engage the teeth 35 of the master gear 12 by the pawl operating cam 3 when the handle 18 is rotated in the forward direction. Moreover, when a strong pulling force is applied by a fish while the fishing string is being taken up, the handle 18 is rotated in the reverse direction to perfectly disengage the master gear 12 from the handle shaft 1 to enable drag operation to reversely rotate the rotor for paying out the string. When combined with the adjustment of the drag pressure effected by the drag knob, this function makes it possible to quickly correspond to the movement of the fish. Thus, it is possible to positively catch the fish by merely rotating the handle 18 in the forward or reverse direction.

Moreover, as the drag mechanism of this invention can be constructed by merely providing the pawl operating cam 3 on the inner end of the operating handle 1, by pivotally mounting pawls 33 and 34 on the ratchet wheel 25 through supporting plate 29 to cooperate cam 3 and by providing teeth 35 for the master gear 12 to be engageable and disengageable with the pawls, and as the drag mechanism can be interposed between the master gear 12 and the ratchet wheel 25, the drag mechanism can be readily obtained by adding only few component elements to the conventional drag mechanism. Moreover, as it is possible to construct the drag mechanism to have a small size it can be readily incorporated into the prior art spinning reel. Further, as it is possible to construct the drag mechanism to be water proof, rusting thereof due to sea water can be prevented, thus improving the durability.

What is claimed is:

1. In a fishing spinning reel having a main body, a hollow handle shaft, a drag shaft concentrically extending through said hollow handle shaft, a master gear for rotating a rotor, said master gear having a hub and being mounted on an inner end of said handle shaft, a supporting plate supporting the inner end of said handle shaft, drag mechanism including drag washers clamping said master gear therebetween, a drag knob threaded onto an outer end of said drag shaft, and a spring interposed between said knob and an outer end of said drag shaft thereby permitting said rotor to slip rotate, and means for preventing reverse rotation of the handle shaft comprising a ratchet wheel mounted on the handle shaft and a pawl pivotally mounted on the body cooperating with the ratchet wheel, said ratchet wheel being in the form of a shallow cup having a sidewall telescoped over said hub of said master gear, the improvement which comprises: releasable driving means interposed between the handle shaft and the master gear, a pawl operating cam provided with radial cam operating members and secured to the inner end of said handle shaft so that the pawl operating cam can rotate a predetermined angle relative to said ratchet wheel, a plurality of pawl pivotally mounted on a plate secured to said ratchet wheel so that said pawls are operated by said cam operating members, said hub of said master gear being provided with ratchet teeth disposed on the radially inner wall which drivingly engage said pawls when said handle is rotated in a forward direction, said pawls being disengaged from the ratchet teeth on the master gear when said handle is rotated in a reverse direction, said drag mechanism remaining operative when said pawls are disengaged from the ratchet teeth on the master gear.

2. The spinning reel according to claim 1 which further comprises a boss secured to the outer end of said handle and a handle foldably connected to said boss.

3. The spinning reel according to claim 1 which further comprises a coil spring contained in an annular groove of said master gear so as to apply braking forces to said ratchet wheel and said master gear.

4. The spinning reel according to claim 1 wherein a shaft for rotating said rotor is disposed perpendicularly to said handle shaft and said drag shaft to be rotated by said master gear.

* * * * *